United States Patent
Nakanishi et al.

(10) Patent No.: US 10,908,356 B2
(45) Date of Patent: Feb. 2, 2021

(54) OPTICAL DEVICE HAVING A FIBER ARRAY, AND METHOD OF ALIGNMENT THEREOF

(71) Applicants: NTT ELECTRONICS CORPORATION, Yokohama (JP); NIPPON TELEGRAPH AND TELEPHONE CORPORATION, Tokyo (JP)

(72) Inventors: Tomohiro Nakanishi, Yokohama (JP); Motoki Minami, Yokohama (JP); Satoru Konno, Yokohama (JP); Yuichi Suzuki, Yokohama (JP); Teruaki Sato, Yokohama (JP); Shigeo Nagashima, Yokohama (JP); Shinji Mino, Yokohama (JP); Motohaya Ishii, Yokohama (JP); Shunichi Soma, Atsugi (JP); Shin Kamei, Atsugi (JP); Shuichiro Asakawa, Atsugi (JP)

(73) Assignees: NTT ELECTRONICS CORPORATION, Kanagawa (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/346,182

(22) PCT Filed: Nov. 2, 2017

(86) PCT No.: PCT/JP2017/039713
§ 371 (c)(1),
(2) Date: Apr. 30, 2019

(87) PCT Pub. No.: WO2018/084238
PCT Pub. Date: May 11, 2018

(65) Prior Publication Data
US 2020/0057192 A1 Feb. 20, 2020

(30) Foreign Application Priority Data
Nov. 7, 2016 (JP) .................................. 2016-217193

(51) Int. Cl.
*G02B 6/30* (2006.01)
*G02B 6/122* (2006.01)
*G02B 6/132* (2006.01)

(52) U.S. Cl.
CPC ............... *G02B 6/122* (2013.01); *G02B 6/30* (2013.01); *G02B 6/132* (2013.01)

(58) Field of Classification Search
CPC ........... G02B 6/30; G02B 6/122; G02B 6/132
(Continued)

(56) References Cited

U.S. PATENT DOCUMENTS 9,513,447 B1 * 12/2016 Celo ..................... G02B 6/1225
9,995,673 B2 * 6/2018 Gunji ..................... G01N 21/05
(Continued)

FOREIGN PATENT DOCUMENTS

CN 104412139 3/2015
JP 5-27130 2/1993
(Continued)

OTHER PUBLICATIONS

International Search Report dated Apr. 10, 2018 from corresponding PCT International Patent Application No. PCT/JP2017/039713, 2 pages.
(Continued)

*Primary Examiner* — Akm E Ullah
(74) *Attorney, Agent, or Firm* — Ohlandt, Greeley, Ruggiero & Perle, L.L.P.

(57) ABSTRACT

An optical circuit board which is mounted with a loop-back circuit for returning aligning light to the fiber array in the vicinity of the fiber array connection end. Since an aligning
(Continued)

loop-back circuit can be formed in an optical waveguide pattern, a production cost does not increase in comparison to an optical circuit board of the related art. The aligning light combined from the optical fiber to the aligning port of the optical circuit board is returned to the optical fiber around the loop-back circuit. Therefore, it is possible to perform alignment using the returned light. That is, alignment can be performed while being mounted on a package without installing a light-reflecting film or mirror.

6 Claims, 11 Drawing Sheets

(58) Field of Classification Search
USPC .......................................................... 385/14
See application file for complete search history.

(56) References Cited

U.S. PATENT DOCUMENTS

| | | | |
|---|---|---|---|
| 10,459,160 B2* | 10/2019 | Brusberg | H05K 1/0274 |
| 2003/0169422 A1* | 9/2003 | Mukai | G02B 6/4225 |
| | | | 356/399 |
| 2005/0232546 A1 | 10/2005 | Francis et al. | |
| 2006/0051010 A1* | 3/2006 | Chu | G02B 6/12007 |
| | | | 385/5 |
| 2008/0001062 A1* | 1/2008 | Gunn | G02B 6/12007 |
| | | | 250/206 |
| 2014/0348513 A1* | 11/2014 | Bolle | B81B 5/00 |
| | | | 398/140 |
| 2015/0022818 A1* | 1/2015 | Lloyd | G01C 25/00 |
| | | | 356/460 |
| 2015/0139589 A1 | 5/2015 | Sakai et al. | |
| 2015/0355421 A1* | 12/2015 | Li | G02B 6/125 |
| | | | 250/227.14 |
| 2016/0202432 A1 | 7/2016 | Chen et al. | |
| 2017/0139237 A1* | 5/2017 | Luo | G02F 1/011 |
| 2017/0163001 A1* | 6/2017 | Evans | G02B 6/12004 |
| 2019/0107673 A1* | 4/2019 | Verslegers | G02B 6/126 |

FOREIGN PATENT DOCUMENTS

| | | |
|---|---|---|
| JP | 8-313744 | 11/1996 |
| JP | 10-227936 | 8/1998 |
| JP | 10-300959 | 11/1998 |
| JP | 2008-268763 | 11/2008 |
| JP | 2011-191647 | 9/2011 |
| JP | 2014-26108 | 2/2014 |

OTHER PUBLICATIONS

Japanese Office Action dated Apr. 23, 2019 in corresponding Japanese Patent Application No. 2016-217193, 7 pages.
International Preliminary Report on Patentability dated May 7, 2019 from corresponding PCT International Patent Application No. PCT/JP2017/039713, 10 pages.
Extended European Search Report dated May 26, 2020 from corresponding European Patent Application No. 17867307.5, 9 pages.
Chinese Office Action dated Mar. 4, 2020 from corresponding Chinese Patent Application No. 2017800670630, 12 pages.

* cited by examiner

OPTICAL DEVICE HAVING A FIBER ARRAY, AND METHOD OF ALIGNMENT THEREOF

BACKGROUND

1. Field of the Disclosure

This disclosure relates to an optical circuit board provided with an optical waveguide used in an optical control device for optical communication or the like, an optical device obtained by coupling a fiber to the optical circuit board, and an alignment method for coupling the optical circuit board and the fiber.

2. Discussion of the Background Art

There is known an optical device obtained by coupling a fiber to an optical circuit board provided with an optical waveguide, in which an aligning optical waveguide used to align and couple the fiber is provided separately from a main circuit section for implementing a control function necessary for the optical control (for example, see Patent Literature 1). Since an aligning optical waveguide having a simple structure can be arranged without depending on a function of the main circuit, design can be made freely, and an optical device can be provided conveniently with high accuracy by coupling an optical fiber array having fibers arranged in positions corresponding to input/output ports of each optical waveguide.

In addition, there is known an optical circuit board in which a lens array can be positioned and coupled without employing a complicated observation system such as a camera in order to manufacture an optical control device (for example, see Patent Literature 2). The optical circuit board of Patent Literature 2 has, as the aligning optical waveguide, a dummy port optical waveguide used in alignment for coupling to the lens array, in addition to the main port optical waveguide through which an optical signal propagates. In the optical circuit board of Patent Literature 1, alignment is performed such that the optical power of the dummy port reflection light is maximized by reflecting the aligning light using the dummy port lens array. In this technique, although alignment is performed for the lens array, alignment can also be made for the fiber by disposing a lens array or a reflection film on an end face where the fiber is coupled and the other end face (an end where light from the aligning optical waveguide is emitted).

CITATION LIST

Patent Literatures

Patent Literature 1: JP 1996-313744 A
Patent Literature 2: JP 2011-191647 A

Technical Problem

In the technique of Patent Literature 1, since it is necessary to arrange the aligning optical waveguide along the main circuit from one end to the other end of the optical circuit board, the size of the optical circuit board increases accordingly, or the main circuit section for arranging an optical component is reduced disadvantageously. In addition, the optical circuit board having the optical waveguide is mounted with an optical component such as a photodiode or a laser diode and is mounted on a package formed of metal or the like. This package has a wall that covers the optical circuit board except for an opening for coupling the fiber array. For this reason, in order to couple the optical circuit board to the fiber array while being mounted on the package, the aligning light combined to the aligning optical waveguide of the optical circuit board from the aligning fiber of the fiber array is blocked by the wall of the package and is not observed by a photodiode (PD) or the like arranged outside, so that it is difficult to perform alignment disadvantageously (refer to FIG. 1).

As described in Patent Literature 2, although alignment can be performed by arranging a reflection film or the like that reflects light to the end of the aligning optical waveguide in advance, a process of installing a reflection film or a process of installing a mirror is necessary, and this increases cost (refer to FIG. 2).

Meanwhile, the alignment work can be performed using the alignment method of the related art by coupling the optical circuit board and the fiber array to each other before mounting them on the package (refer to FIG. 3). However, the fiber array coupled to the optical circuit board hinders the process of mounting the optical circuit board to the package, and this degrades efficiency of the mounting work disadvantageously.

In this regard, an object of the present disclosure is to provide an optical circuit board, an optical device, and an alignment method, capable of removing necessity of an extra component or process for aligning the optical circuit board and the fiber array with low cost.

SUMMARY

Solution to Problem

In order to achieve the aforementioned object, the optical circuit board according to the present disclosure is mounted with a loop-back circuit for returning the aligning light to the fiber array in the vicinity of a fiber array connection end.

Specifically, according to the present disclosure, an optical circuit board includes:

a functional circuit unit having an optical component and an optical waveguide that receives or outputs light from/to the optical component; and a waveguide unit to which an optical fiber is coupled, in which the waveguide unit has an input/output optical waveguide and a loop-back circuit, the input/output optical waveguide has one end coupled to a signal port coupled to an optical fiber and the other end coupled to the optical waveguide of the functional circuit unit, and the loop-back circuit has a relay waveguide coupled to an aligning port used in alignment with the optical fiber to allow light incident to the aligning port to propagate, and a loop waveguide that branches light propagating through the relay waveguide, makes the light loop back and joins the relay waveguide again.

Since the aligning loop-back circuit can be formed using an optical waveguide pattern, it can be manufactured using the same process as that of the optical circuit board of the related art, and the product cost does not increase. The aligning light combined to the aligning port of the optical circuit board from the optical fiber returns to the aligning port via the loop-back circuit and returns to the optical fiber. For this reason, alignment can be performed using this returned light. That is, it is possible to perform alignment in a package mount state without adding an aligning member or process such as installation of a light reflection film or mirror.

Since the aligning light passes through the aligning port twice in the events of incidence and emission, it is possible to improve loss sensitivity for the aligning position and the aligning accuracy.

Therefore, since an extra member for aligning the optical circuit board and the fiber array is not necessary according to the present disclosure, an extra process is not necessary in the corresponding alignment without increasing the size, so that it is possible to provide an optical circuit board with low cost.

The input/output optical waveguide and the relay waveguide of the optical circuit board according to the present disclosure are arranged with an inclination angle with respect to the surface where the signal port and the aligning port are arranged. Since the optical waveguide and the optical fiber are arranged aslant with respect to the coupling surface between the optical circuit board and the fiber array, it is possible to reduce influence of the reflection light generated on the coupling surface on alignment.

As a first aspect of the optical circuit board according to the present disclosure, the signal ports and the aligning ports are arranged such that all of the signal ports are placed between a pair of the aligning ports. Since a pair of aligning ports and corresponding fibers are aligned when the optical circuit board and the fiber array are coupled, it is also possible to perform alignment in the rotation direction around an optical axis of the fiber.

In this case, in the optical circuit board according to the present disclosure, an interval between the aligning port and the signal port closest to the aligning port is wider than an interval between the signal ports. It is possible to widen the interval of the aligning fiber of the fiber array and reduce a slope of the lid board that presses the optical fiber toward the V-grooved board during manufacturing of the fiber array and to improve a product yield of the fiber array.

According to the present disclosure, a first optical device includes: the optical circuit board according to the first aspect of the disclosure; and a fiber array having signal fibers juxtaposed with an interval of the signal ports of the optical circuit board and aligning fibers arranged in positions of the aligning ports of the optical circuit board, the fiber array being coupled to the optical circuit board such that each end of the signal fiber abuts on the signal port, and an end of the aligning fiber abuts on the aligning port.

According to the present disclosure, there is provided an alignment method for positioning the optical circuit board and the fiber array to manufacture the first optical device, the alignment method including:

a temporary coupling process for coupling the optical circuit board and the fiber array with predetermined accuracy;

a light incidence process for inputting aligning light to the aligning fiber of the fiber array;

a light-receiving process for coupling the aligning light incident in the light incidence process to the aligning port of the optical circuit board, making the light loop back around the loop-back circuit and return to the aligning port, and receiving the returned light combined to the aligning fiber; and a main coupling process for adjusting positions of the optical circuit board and the fiber array and fixing the optical circuit board and the fiber array such that an intensity of the returned light received in the light-receiving process is maximized.

As a second aspect of the optical circuit board according to the present disclosure, at least two signal ports have the aligning ports corresponding to the signal ports, and each of the aligning ports is arranged apart from the corresponding signal port by the same distance in the same direction. Light is combined to the loop-back circuit using the optical signal optical fiber, and alignment is performed, so that the optical circuit board and the fiber array are coupled to each other by translating the fiber array in parallel. Since it is possible to perform alignment without using the aligning fiber that becomes unnecessary as the coupling is completed, it is possible to miniaturize the fiber array and reduce cost.

As a third aspect of the optical circuit board according to the present disclosure, the waveguide unit further has aligning ports paired with the aforementioned aligning ports, and each of the paired aligning ports is arranged apart from the corresponding signal port by the same distance in the same direction such that the signal port is interposed between the aligning port and the paired aligning port. The aligning ports are arranged in both sides of a single signal port and are translated in parallel to be aligned between both the aligning ports. For this reason, it is possible to check and correct a deviation in the thickness direction of the optical circuit board at the time of parallel translation of the fiber array after the alignment.

The second and third optical devices according to the present disclosure include:

the optical circuit board according to the second or third aspect; and a signal fiber juxtaposed with an interval of the signal port of the optical circuit board, in which each end of the signal fiber is coupled to the optical circuit board so as to abut on the signal port, and the aligning port of the optical circuit board is not coupled to any fiber of the fiber array.

According to the present disclosure, there is provided an alignment method for positioning the optical circuit board and the fiber array to manufacture the second optical device having the optical circuit board of the second aspect, the alignment method including:

a temporary coupling process for coupling the optical circuit board and the fiber array with predetermined accuracy;

a light incidence process for inputting aligning light to the signal fiber having an end abutting on the aligning port of the optical circuit board out of the signal fibers of the fiber array;

a light-receiving process for combining the aligning light incident in the light incidence process to the aligning port of the optical circuit board, making the light loop back around the loop-back circuit and return to the aligning port, and receiving the returned light combined to the signal fiber to which the aligning light has been input;

a position adjustment process for adjusting positions of the optical circuit board and the fiber array such that an intensity of the returned light received in the light-receiving process is maximized; and a main coupling process for translating the fiber array in parallel from the aligning port of the optical circuit board toward the signal port by a distance of the signal port and fixing the fiber array after the position adjustment process.

Note that each of the embodiments described above can be combined with each other as long as possible.

Advantageous Effects of Disclosure

According to the present disclosure, it is possible to provide an optical circuit board, an optical device, and an alignment method, capable of removing necessity of providing an extra member or process for aligning the optical circuit board and the fiber array with low cost.

DETAILED DESCRIPTION OF THE PREFERRED EMBODIMENT

Figure 1:
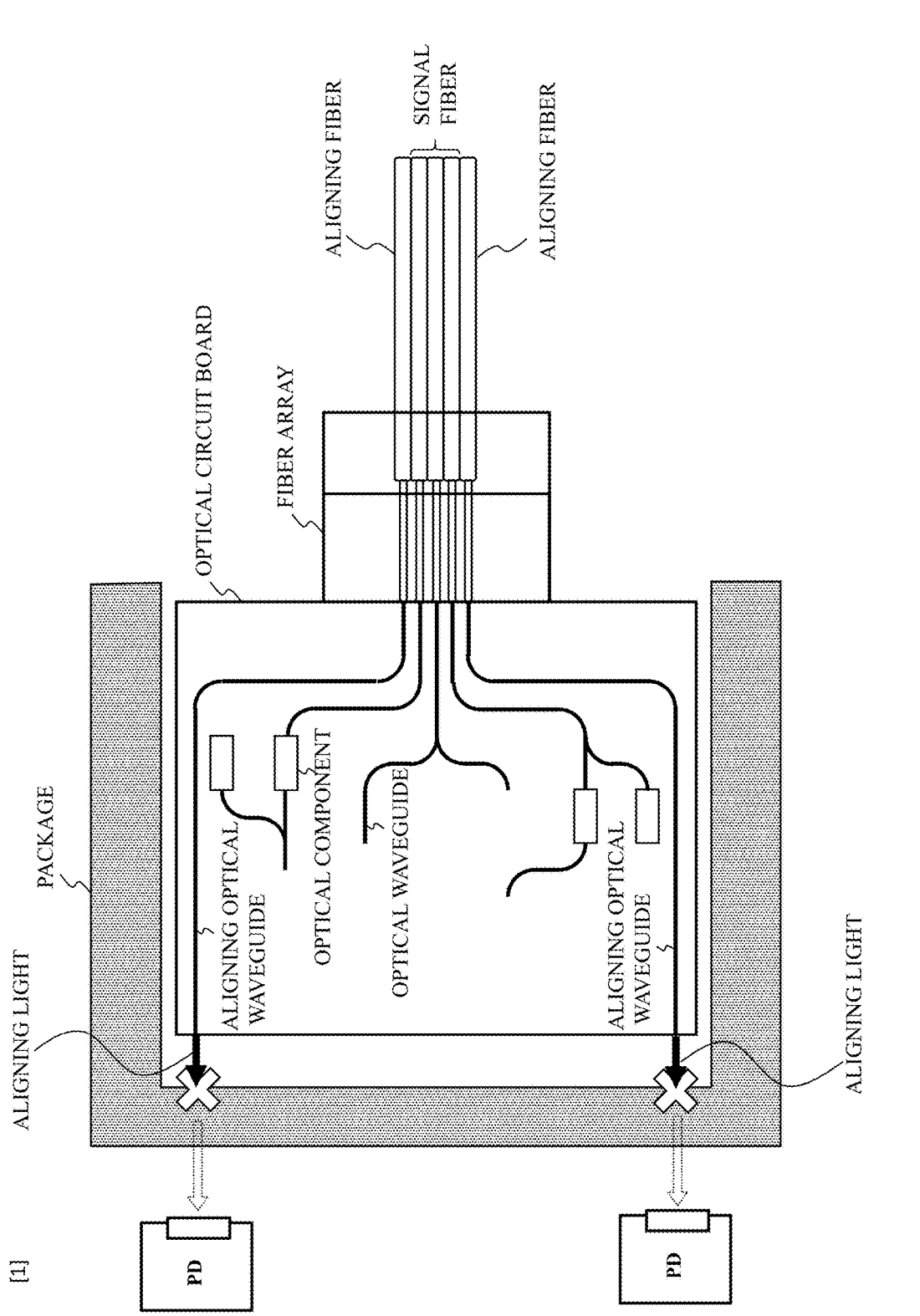
FIG. 1 is a diagram illustrating a problem to be addressed by the present disclosure.

Embodiments of the present disclosure will be described with reference to the accompanying drawings. The embodiments described below are examples of the present disclosure and are not intended to limit the scope of the disclosure. Note that like reference numerals denote like elements throughout the specification and drawings.

First Embodiment

Figure 4:
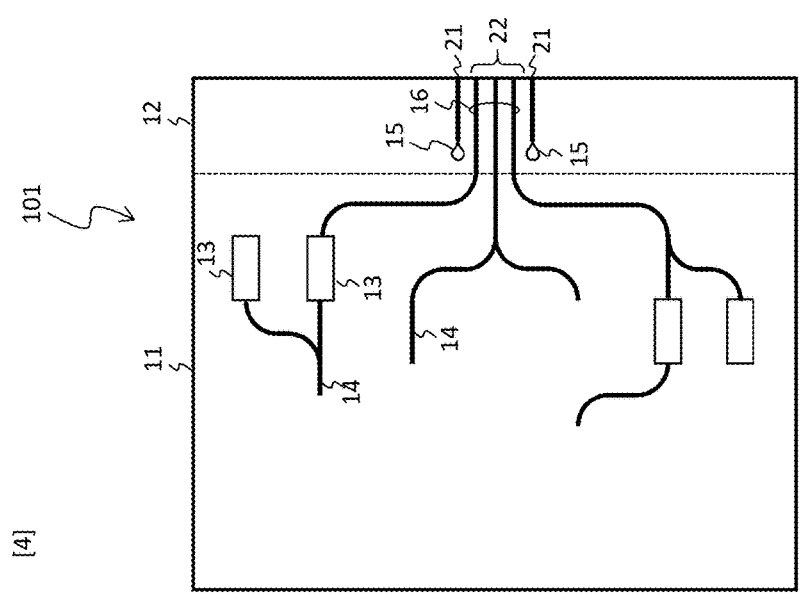
FIG. 4 is a diagram illustrating an optical circuit board according to the present disclosure.

FIG. 4 is a diagram illustrating an optical circuit board 101 according to this embodiment. The optical circuit board 101 functionally includes a pair of sections (functional circuit unit 11 and waveguide unit 12).

In the functional circuit unit 11, a function circuit such as an AWG or an optical component 13 is coupled to a waveguide 14, and the waveguide 14 is coupled to a signal port 22 through an input/output optical waveguide 16 of the waveguide unit 12. The waveguide unit 12 has an input/output optical waveguide 16 and a loop-back circuit 15. One end of the input/output optical waveguide 16 is coupled to the waveguide 14, and the other end is coupled to the signal port 22.

The loop-back circuit 15 includes a loop waveguide and a relay waveguide, and the relay waveguide is coupled to an aligning port 21. The signal port 22 and the aligning port 21 are formed on an end face of the optical circuit board 101.

Here, the optical component 13 includes an active element such as a photodiode or a laser diode, a passive element such as a wave plate or a thin-film filter, or an optical waveguide circuit included in an optical coupler, a splitter, a wavelength multiplexer/demultiplexer, a switch, a modulator, or the like.

Note that, in the optical circuit board 101 of FIG. 4, all of the signal ports 22 are arranged between a pair of aligning ports 21. That is, the aligning ports 21 are arranged in at least both outer sides of the signal port 22.

Figure 2:
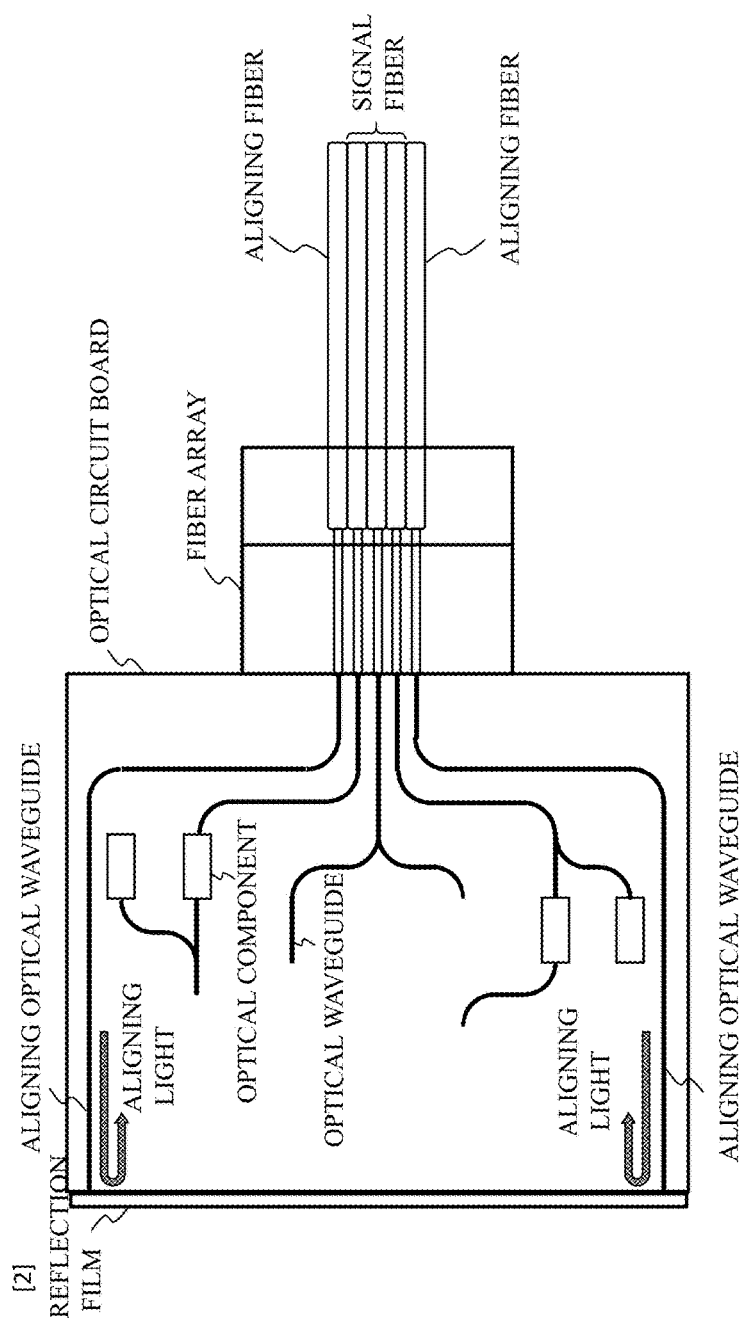
FIG. 2 is a diagram illustrating a problem to be addressed by the present disclosure.
Figure 3:
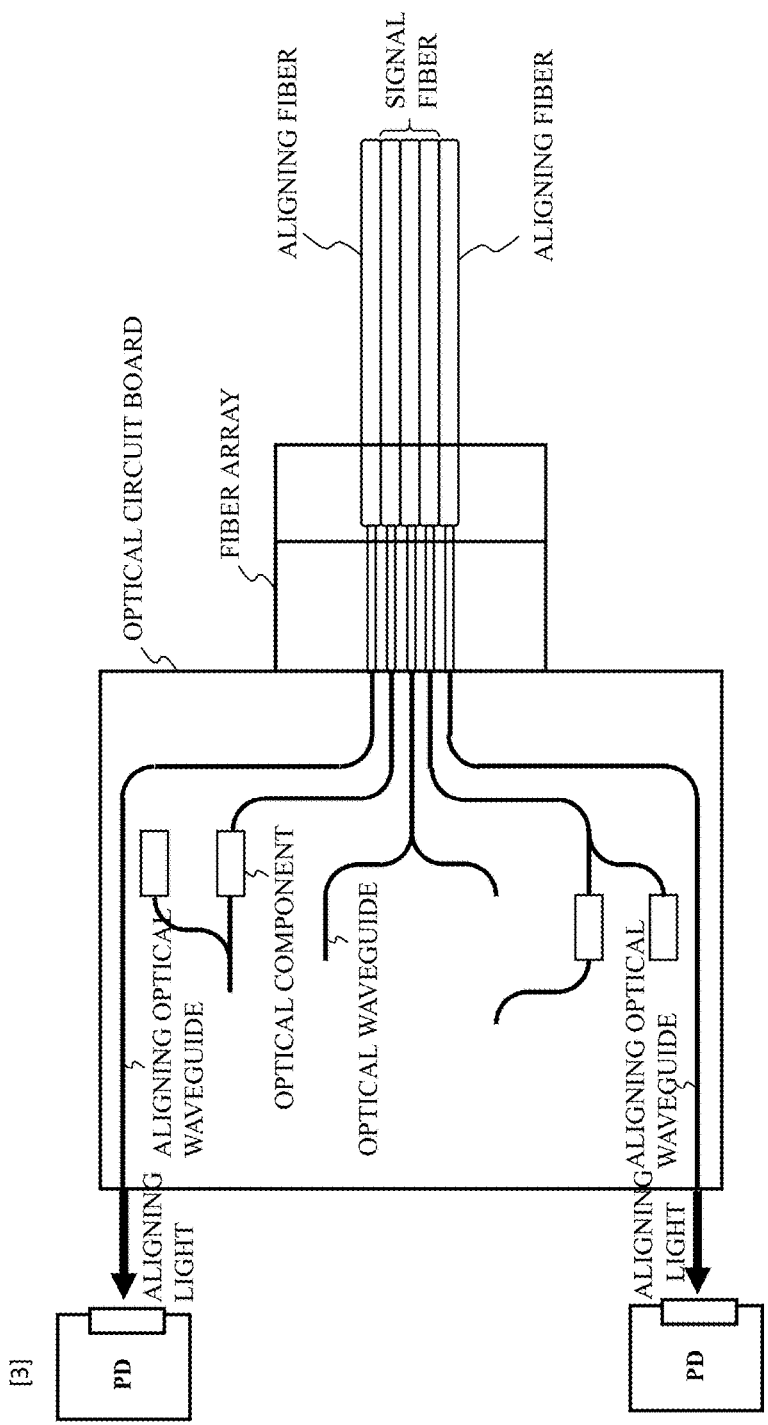
FIG. 3 is a diagram illustrating a problem to be addressed by the present disclosure.
Figure 5:
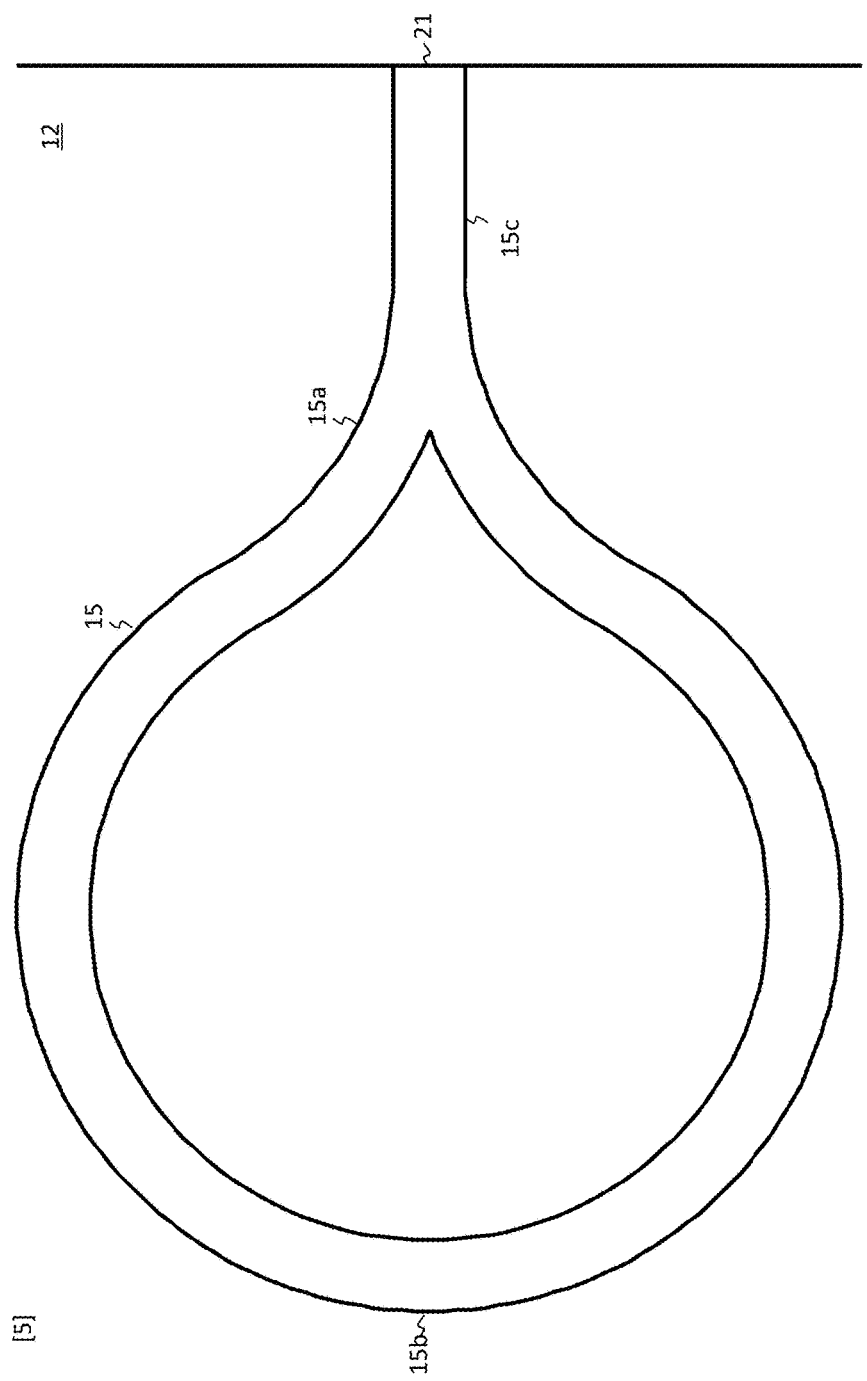
FIG. 5 is a diagram illustrating a loop-back circuit.

The optical circuit board 101 according to this embodiment and the optical circuit board of the related art described with reference to FIGS. 1 to 3 are different in that the optical circuit board 101 has a loop-back circuit 15 instead of the aligning optical waveguide. FIG. 5 illustrates a shape of the loop-back circuit 15. The loop-back circuit 15 includes loop waveguides (15a and 15b) and a relay waveguide 15c. The light incident from the aligning port 21 propagates through the relay waveguide 15c, is branched at a joining/branching portion 15a, loops back around a loop portion 15b, joins again the joining/branching portion 15a, propagates through the relay waveguide 15c, and is emitted from the aligning port 21. Since the light branched at the joining/branching portion 15a joins the joining/branching portion 15a, a branching ratio of the joining/branching portion 15a is arbitrary. In addition, although a loss of the loop-back circuit 15 is defined by a specific refractive index of a core against a clad and a curvature of the loop portion 15b, the light passing through the loop-back circuit 15 is the aligning light, and the curvature of the loop portion 15b may be determined from a loss allowable in the alignment and the specific refractive index. Note that the loop-back circuit 15 can be formed to have a radius of curvature of 10 μm by forming the waveguide on the optical circuit board 101 according to this embodiment using a silicon thin-line waveguide.

According to this embodiment, although the joining/branching portion 15a is formed in a Y-branch type, the joining/branching portion 15a may be formed in a directional coupler type, a multimodal interference (MMI) type, or the like.

Since the loop-back circuit 15 can be arranged in an arbitrary position of the optical circuit board 101, it can be arranged regardless of a layout of the functional circuit unit 11. This is because the loop-back circuit 15 has a very small occupied area, so that the loop-back circuit 15 can be arranged in an area of the waveguide unit 12 without affecting the layout of the functional circuit unit 11. In addition, since the loop-back circuit 15 has a size sufficiently insertable into the width of the optical circuit board 101 defined by the functional circuit unit 11, the aligning port 21 can be arranged in an arbitrary position, so that the size of the optical circuit board 101 does not increase by forming the loop-back circuit 15. Note that, although the relay waveguide 15c of the loop-back circuit 15 of FIG. 4 is formed straightly, and the loop portion 15b of the loop waveguide is arranged on an extension line of the relay waveguide 15c, the relay waveguide 15c of the loop-back circuit 15 may also be curved.

Note that, although the aligning ports 21 (loop-back circuits 15) are arranged in both sides of a set of three signal ports 22 (optical waveguide 16) in FIG. 4, the number and the arrangement of the aligning ports 21 are not limited thereto. One or more aligning ports 21 and one or more signal ports 22 may be provided. Furthermore, the positions of each port are not limited to those of FIG. 4.

Second Embodiment

Figure 6:
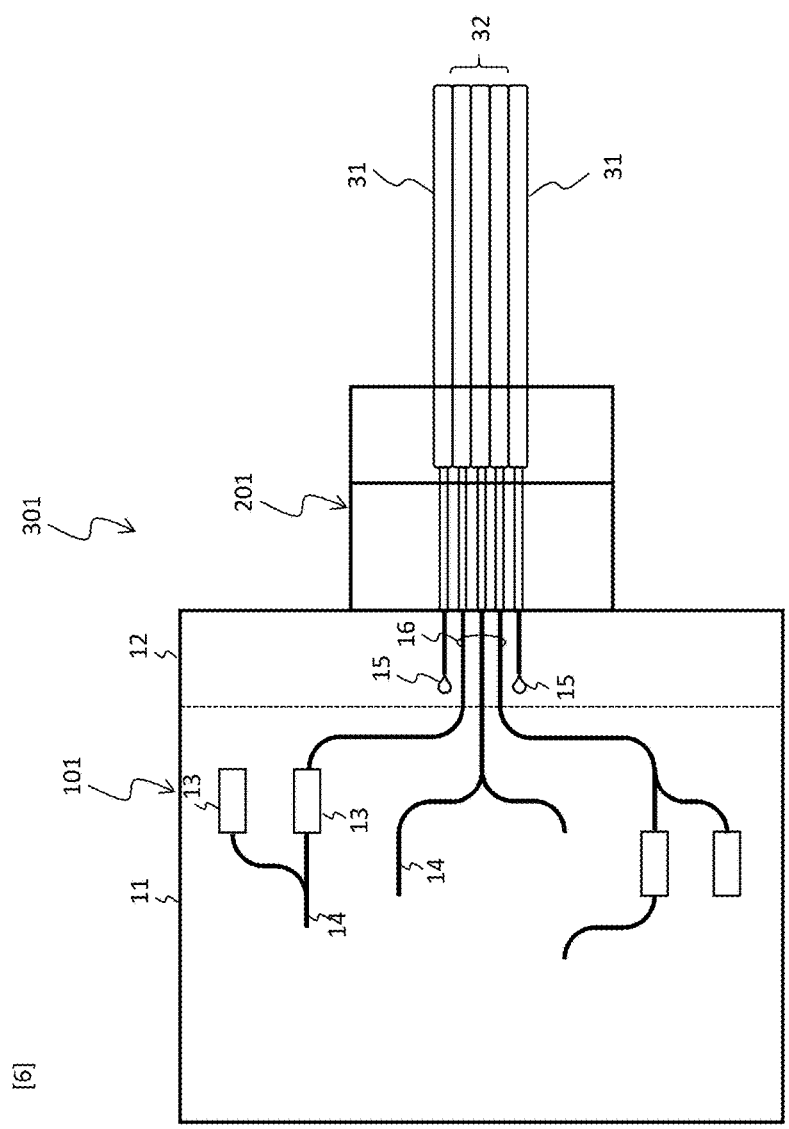
FIG. 6 is a diagram illustrating an optical device according to the present disclosure.

FIG. 6 is a diagram illustrating an optical device 301 according to this embodiment. In the optical device 301, a fiber array 201 is coupled to the optical circuit board 101 of FIG. 4. In the fiber array 201, the signal fibers 32 juxtaposed with an interval of the signal port 22 of the optical circuit board 101 and the aligning fibers 31 arranged in positions of the aligning ports 21 of the optical circuit board 101 are fixed to a V-grooved board and a lid board, so that each end of the signal fiber 32 abuts on the signal port 22, and each end of the aligning fiber 31 abuts on the aligning port 21.

At the time of manufacturing the optical device 301, it is necessary to position the optical circuit board 101 and the fiber array 201. In this case, the alignment method includes a temporary coupling process for coupling the optical circuit board 101 and the fiber array 201 with predetermined accuracy and a main coupling process for aligning and fixing them by inputting the aligning light to the aligning fiber 31 of the fiber array 201. In this main coupling process, first, the aligning light is input to the aligning fiber 31 of the fiber array 201 (light incidence process). Next, this aligning light looped back around the loop-back circuit 15 is received (receiving process). The aligning light incident to the aligning fiber 31 is combined to the aligning port 21 of the optical circuit board 101, loops back around the loop-back circuit 15, returns to the aligning port 21, is combined to the aligning fiber 31, and is received by an optical receiver as returned light. Then, positions of the optical circuit board 101 and the fiber array 201 are adjusted (aligning process) such that an intensity of the received returned light is maximized. Finally, at the position where the light intensity of the returned light is maximized, the end faces of the optical circuit board 101 and the fiber array 201 are fixed to each other.

The coupling accuracy of the temporary coupling process may be set such that the aligning light from the aligning fiber 31 can be combined to the loop-back circuit 15. This is a process of adjusting the end of the aligning fiber 31 to the position of the aligning port 21 by making the end faces of the optical circuit board 101 and the fiber array 201 contact with each other and slightly moving the fiber array 201 along two perpendicular directions with respect to an optical axis. In the light incidence process, the aligning light is input to all of the aligning fibers 31. In the light-receiving process, all of the returned light beams (two light beams in FIG. 6) are received, and an intensity of the returned light from the loop-back circuit 15 is measured. In the aligning process, a position where the intensities of all of the returned light beams are maximized is searched by slightly moving the fiber array 201. The end faces of the optical circuit board 101 and the fiber array 201 are fixed in this position. The fixation may be performed, for example, using an ultraviolet curable adhesive. The ultraviolet curable adhesive is applied to the end faces of the optical circuit board 101 and the fiber array 201, alignment is performed, and the end faces are coupled and fixed by irradiating ultraviolet rays to the coupled end faces while holding the maximum light intensity position. Since there are two returned light beams in the optical device 301 of FIG. 6, it is possible to correct a twist between the optical circuit board 101 and the fiber array 201 (alignment in a rotation direction around an optical axis of the fiber) as well as the X-direction and the Y-direction on the coupling face between the optical circuit board 101 and the fiber array 201. Note that the X-direction is a direction where the aligning ports 21 and the signal ports 22 are arranged on the coupling face, and the Y-direction is a thickness direction of the optical circuit board 101.

In a case where a single aligning port 21 is provided, a mutual twist in the rotation direction around the fiber is removed by making the optical circuit board 101 and the fiber array 201 abut on a reference surface such as a surface plate in advance, and the optical circuit board 101 and the fiber array 201 can be aligned by aligning the aligning ports 21 and the aligning fibers 31.

Third Embodiment

Figure 7:
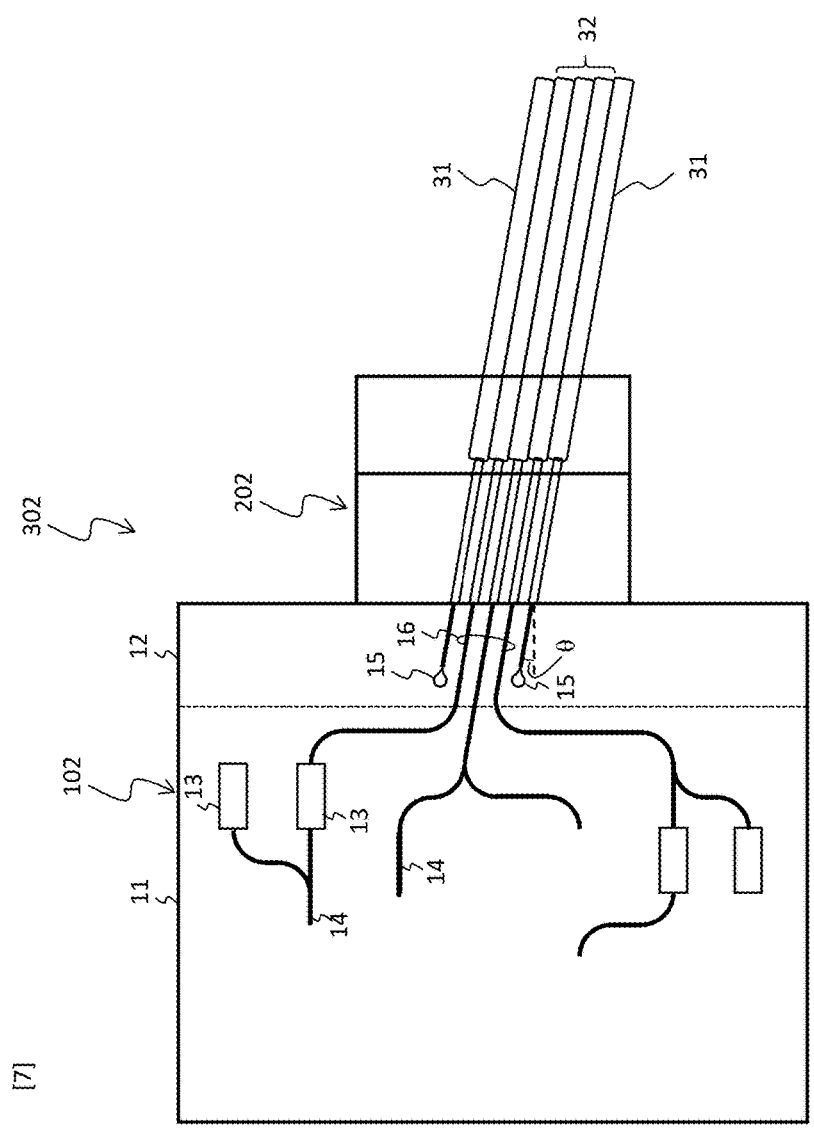
FIG. 7 is a diagram illustrating an optical device according to the present disclosure.

FIG. 7 is a diagram illustrating an optical device 302 according to this embodiment. In the optical device 302, a fiber array 202 is coupled and fixed to an optical circuit board 102. The optical circuit board 102 is different from the optical circuit board 101 of FIG. 4 in that the optical waveguide 16 and the loop-back circuit 15 of the optical circuit board 102 are arranged at an inclination angle (θ) with respect to a normal direction to a surface where the signal ports 22 and the aligning ports 21 are arranged. Since the optical waveguide 16 and the loop-back circuit 15 are arranged aslant, the aligning fiber 31 and the signal fiber 32 of the fiber array 202 are also coupled aslant. The alignment method at the time of coupling is similar to that described in the second embodiment.

Fourth Embodiment

Figure 8:
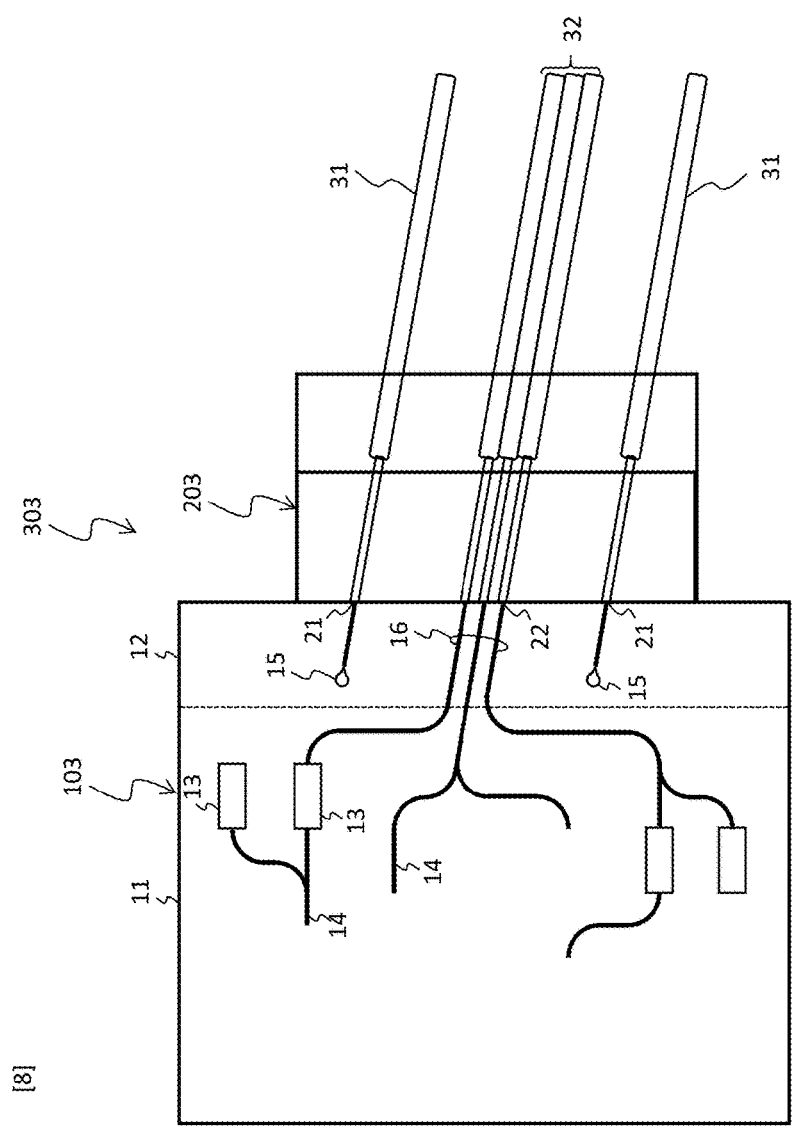
FIG. 8 is a diagram illustrating an optical device according to the present disclosure.

FIG. 8 is a diagram illustrating an optical device 303 according to this embodiment. In the optical device 303, a fiber array 203 is coupled and fixed to the optical circuit board 103. The optical circuit board 103 is different from the optical circuit board 102 of FIG. 7 in that an interval between the aligning port and the signal port 22 closest to the aligning port 21 of the optical circuit board 103 is wider than the interval between the signal ports 22. Since the aligning port 21 is arranged apart from the signal port 22, the aligning fiber 31 of the fiber array 203 is also arranged apart from the signal fiber 32. The alignment method at the time of coupling is similar to that described in the second embodiment.

Fifth Embodiment

Figure 9:
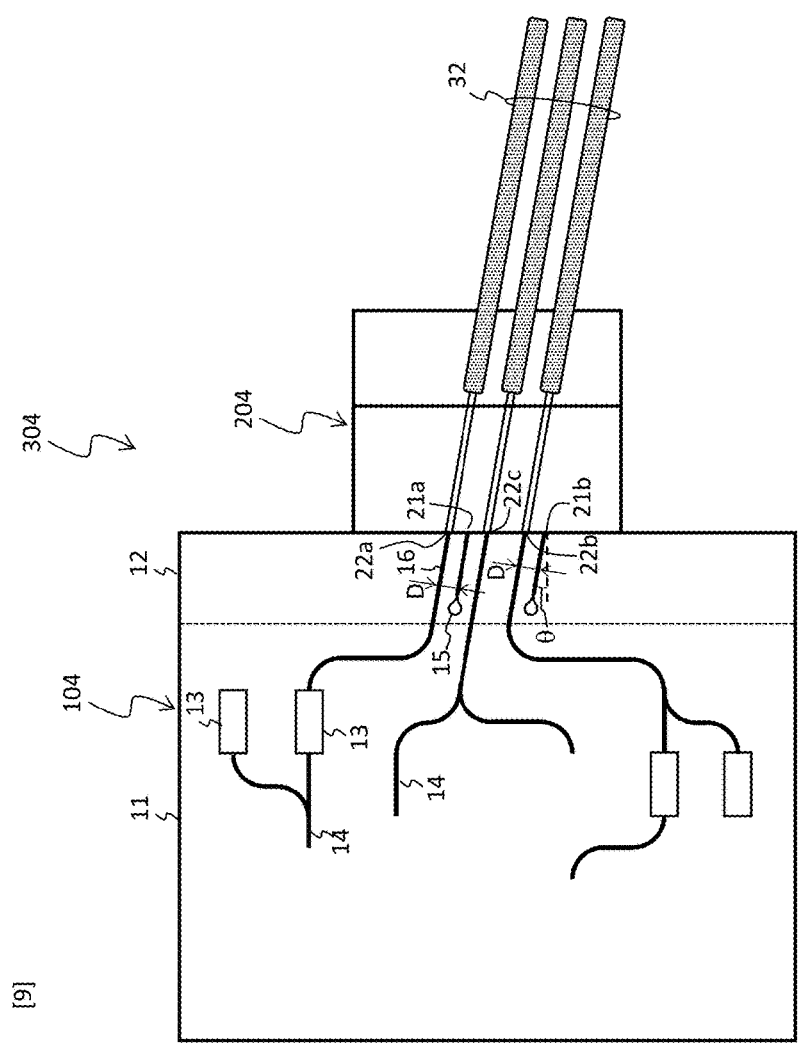
FIG. 9 is a diagram illustrating an optical device according to the present disclosure.

FIG. 9 is a diagram illustrating an optical device 304 according to this embodiment. In the optical device 304, a fiber array 204 is coupled and fixed to an optical circuit board 104. The fiber array 204 according to this embodiment does not have the aligning fiber. That is, the aligning port 15 of the optical circuit board 104 according to this embodiment is not coupled to any fiber of the fiber array 204.

The optical circuit board 104 has signal ports (22a and 22b) arranged in the outer sides of the optical waveguide 16 in the waveguide unit 12 and aligning ports (21a and 21b) corresponding to the signal ports (22a and 22b), respectively, and the aligning ports (21a and 21b) are arranged apart from the corresponding signal port (22a and 22b), respectively, by the same distance (D) in the same direction. That is, a distance between the aligning port (21a) and the corresponding signal port (22a) is equal to a distance between the aligning port (21b) and the corresponding signal port (22b), and they are arranged in the same direction. If the signal fibers 32 optically coupled to the aligning ports (21a and 21b) make contact with the end face of the optical circuit board 104 and are translated in parallel toward the aligning port by a predetermined distance (D cos θ), each end face of the signal fibers matches each of the signal ports (22a, 22b, and 22c), so that the signal fibers and the signal ports are placed in optical coupling positions.

The fiber arrays (201 to 203) described in the second to fourth embodiments become unnecessary when the optical circuit board and the fiber array are completely aligned. For example, in the alignment method described in the second embodiment, an aligning fiber removal process for removing the aligning fiber 31 from the fiber array 201 by cutting after the main coupling process work is necessary.

In comparison, in the optical device 304 according to the fifth embodiment, since the aligning fiber becomes unnecessary by using the signal fiber 32 as the aligning fiber, it is possible to remove necessity of the aligning fiber removal process. In addition, since the fiber array 204 can be minimized as much as the aligning fiber, the fiber array 204 does not serve as hindrance at the time of mounting to the package, and is easily mounted to the optical circuit board 104. In the optical device 304, the optical circuit board 104 and the fiber array 204 can be positioned without using the aligning fiber by performing the following alignment method.

The alignment method according to this embodiment includes a temporary coupling process for coupling the optical circuit board 104 and the fiber array 204 with predetermined accuracy such that an end of the signal fiber 32 arranged in the outer side out of the signal fibers 32 of the fiber array 204 abuts on the aligning ports (21a and 21b) of the optical circuit board 104, a process of determining positions (position determination process) by inputting aligning light to a predetermined signal fiber out of the signal fibers 32 of the fiber array 204 (light incidence process), and a main coupling process for coupling and fixing the positioned fiber array 204 to the optical circuit board 104 by moving it by a predetermined distance.

The coupling accuracy in the temporary coupling process may be set such that the aligning light from the signal fiber 32 can be combined to the loop-back circuit 15.

In the position determination process, first, aligning light is input to the signal fiber 32 where an end of the signal fiber 32 of the fiber array 204 abuts on the aligning ports (21a and 21b) of the optical circuit board 104 (light incidence process). The aligning light incident in the light incidence process is combined to the aligning ports (21a and 21b) of the optical circuit board 104, loops back around the loop-back circuit 15, returns to the aligning ports (21a and 21b), and is combined to the signal fiber 32 to which the aligning light has been input. This returned light is received by an optical receiver (light-receiving process). Then, positions of the optical circuit board 104 and the fiber array 204 are adjusted (position adjustment process) such that the intensity of the returned light received in the light-receiving process is maximized in order to position the fiber array 204.

Finally, the fiber array 204 positioned in the main coupling process is coupled and fixed to the optical circuit board 104 by moving the fiber array 204 by a predetermined distance. The fiber array 204 slides from the aligning ports (21a and 21b) to the signal ports (22a and 22b), respectively, (in the X-direction) by a predetermined distance (D cos θ) while holding a contact with the optical circuit board 104. This movement makes the ends of each signal fiber 32 of the fiber array 204 abut on the signal port. The coupling and fixing may be performed in the manner similar to that of the first embodiment.

Figure 10:
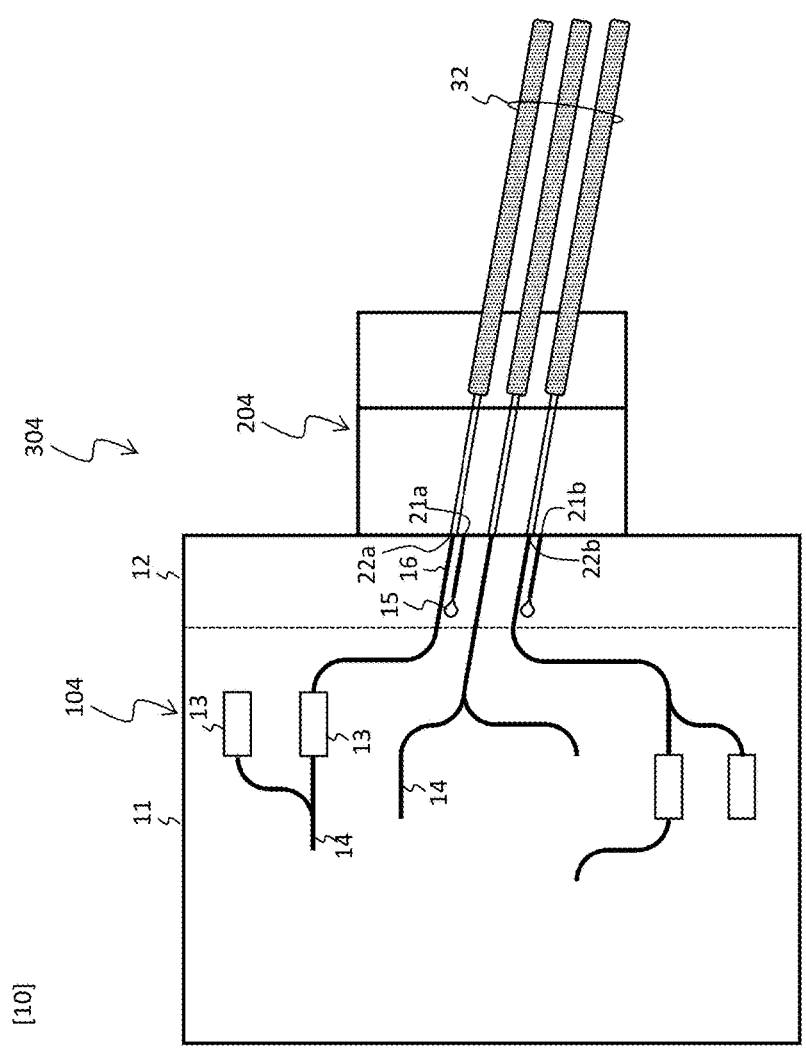
FIG. 10 is a diagram illustrating an optical device according to the present disclosure.

Note that a movement amount for deviating the fiber array 204 in the main coupling process can be reduced by approaching the aligning ports (21a and 21b) and the signal ports (22a and 22b), respectively, until they are not optically interfere with each other as illustrated in FIG. 10. Typically, although the deviation amount increases from a design value as the movement amount increases, the movement amount is small in this embodiment, so that it is possible to reduce a deviation amount between the end of the signal fiber 32 and the signal port after the main coupling process.

Sixth Embodiment

Figure 11:
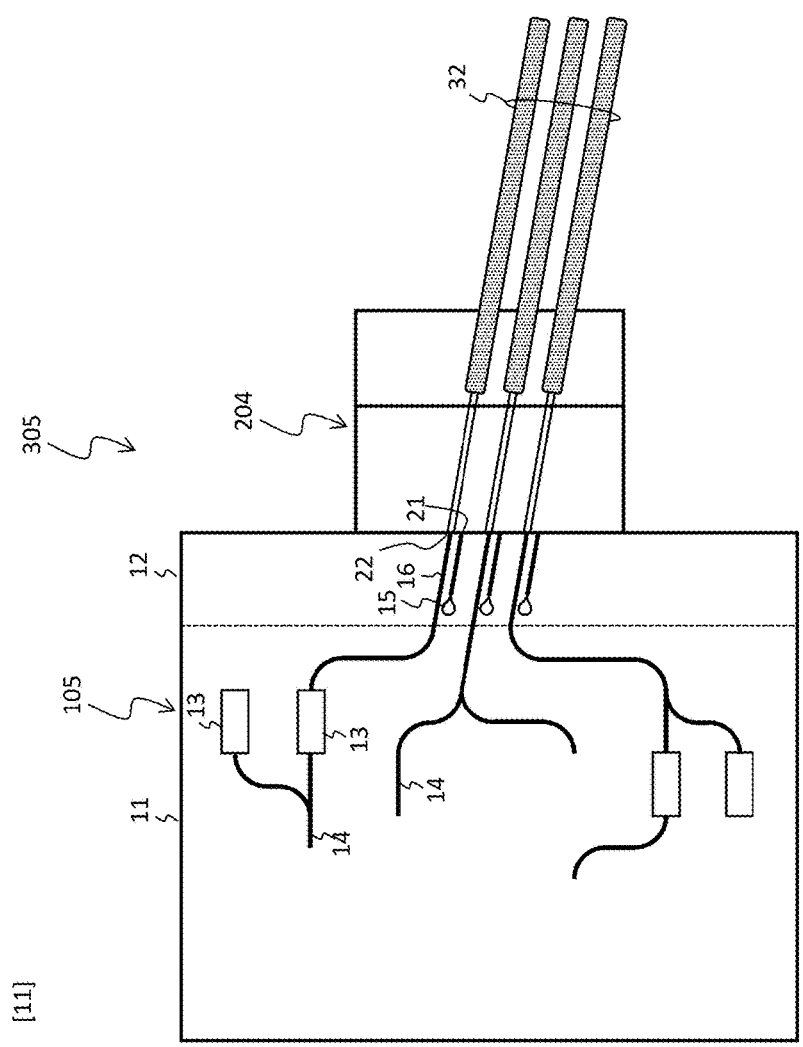
FIG. 11 is a diagram illustrating an optical device according to the present disclosure.

FIG. 11 is a diagram illustrating an optical device 305 according to this embodiment. The optical device 305 has an optical circuit board 105 and a fiber array 204. The optical circuit board 105 is different from the optical circuit board 104 of FIG. 10 in that corresponding aligning ports 21 are arranged adjacent to all of the signal ports 22 in the optical circuit board 105. That is, in the waveguide unit 12 of the optical circuit board 105, each signal port 22 has the corresponding aligning port 21, and each aligning port 21 is arranged apart from the corresponding signal port 22 by the same distance in the same direction.

The optical device 305 is also manufactured using the alignment method described in conjunction with the optical device 304 of FIG. 9. For this reason, the aligning fiber removal process is not necessary for the optical device 305 as well. In addition, the alignment can be performed using all of the aligning ports 21 in the optical device 305, and distribution of coupling losses in each signal port 22 can be adjusted. For example, even when a fiber pitch of the fiber array 204 is deviated from a design value, it is possible to align the optical circuit board 105 and the fiber array 204 with a minimum loss by adding coupling losses of all of the aligning ports 21 and performing adjustment to minimize the added value at the time of alignment.

REFERENCE SIGNS LIST

11 FUNCTIONAL CIRCUIT UNIT
12 WAVEGUIDE UNIT
13 OPTICAL COMPONENT
14 WAVEGUIDE
15 LOOP-BACK CIRCUIT
15a JOINING/BRANCHING PORTION
15b LOOP PORTION
15c RELAY WAVEGUIDE
16 INPUT/OUTPUT OPTICAL WAVEGUIDE
21, 21a, 21b ALIGNING PORT
22, 22a, 22b SIGNAL PORT
31 ALIGNING FIBER
32 SIGNAL FIBER
101 to 106 OPTICAL CIRCUIT BOARD
201 to 204 FIBER ARRAY
301 to 306 OPTICAL DEVICE

The invention claimed is:
1. An optical device comprising:
an optical circuit board comprising:
a functional circuit unit having an optical component and an optical waveguide that receives or outputs light from/to the optical component; and a waveguide unit to which an optical fiber is coupled,
wherein the waveguide unit has an input/output optical waveguide and a loop-back circuit,
the input/output optical waveguide has one end coupled to a signal port which is coupled to the optical fiber and the other end coupled to the optical waveguide of the functional circuit unit, and
the loop-back circuit has a relay waveguide which is coupled to an aligning port used in alignment with the optical fiber, allows light input to the aligning port to propagate, and a loop waveguide that branches light propagating through the relay waveguide, makes the light loop back and joins the relay waveguide; and
a fiber array consisting of signal fibers juxtaposed with an interval of the signal ports of the optical circuit board, wherein each end of the signal fiber is coupled to the optical circuit board so as to abut on the signal port, and the aligning port of the optical circuit board is not coupled to any fiber of the fiber array.

2. The optical device according to claim 1, wherein
at least two signal ports have the aligning ports corresponding to the signal ports, and
each of the aligning ports is arranged apart from the corresponding signal port by the same distance in the same direction.

3. An alignment method for positioning an optical circuit board and a fiber array to manufacture an optical device, the alignment method comprising:
a temporary coupling process for coupling the optical circuit board and the fiber array with predetermined accuracy;
a light inputting process for inputting aligning light to the signal fiber having an end abutting on the aligning port of the optical circuit board among the signal fibers of the fiber array;
a light-receiving process for receiving return-light returned to the signal fiber to which the aligning light has been input, the return-light is the aligning light which is input to the aligning port of the optical circuit board from the signal fiber, returned to the aligning port through the loop-back circuit, and connected to the signal fiber to which the aligning light has been input;
a position adjustment process for adjusting positions of the optical circuit board and the fiber array such that an intensity of the returned light is maximized; and
a main coupling process for translating the fiber array in parallel from the aligning port of the optical circuit board toward the signal port by a distance from the aligning port of the optical circuit board toward the signal port and fixing the optical circuit board and the fiber array,
wherein the optical device comprises
the optical circuit board; and
signal fibers juxtaposed with an interval of the signal ports of the optical circuit board,
wherein each end of the signal fiber is coupled to the optical circuit board so as to abut on the signal port, and the aligning port of the optical circuit board is not coupled to any fiber of the fiber array,
wherein the optical circuit board comprises
a functional circuit unit having an optical component and an optical waveguide that receives or outputs light from/to the optical component; and a waveguide unit to which an optical fiber is coupled,
wherein the waveguide unit has an input/output optical waveguide and a loop-back circuit,
the input/output optical waveguide has one end coupled to a signal port which is coupled to the optical fiber and the other end coupled to the optical waveguide of the functional circuit unit, and
the loop-back circuit has a relay waveguide which is coupled to an aligning port used in alignment with the optical fiber, allows light input to the aligning port to propagate, and a loop waveguide that branches light propagating through the relay waveguide, makes the light loop back and joins the relay waveguide.

4. The alignment method according to claim 3, wherein
at least two signal ports have the aligning ports corresponding to the signal ports, and
each of the aligning ports is arranged apart from the corresponding signal port by the same distance in the same direction.

5. The alignment method according to claim 3, wherein the input/output optical waveguide and the relay waveguide are arranged with an inclination angle with respect to a surface where the signal port and the aligning port are arranged.

6. The optical device according to claim 1, wherein the input/output optical waveguide and the relay waveguide are arranged with an inclination angle with respect to a surface where the signal port and the aligning port are arranged.

* * * * *